Patented Aug. 16, 1949

2,479,542

UNITED STATES PATENT OFFICE 2,479,542

PREPARATION OF MERCAPTANS

Joseph C. Patrick, Morrisville, Pa., assignor to Thiokol Corporation, Trenton, N. J., a corporation of Delaware No Drawing. Application August 26, 1944, Serial No. 551,431

1 Claim. (Cl. 260—609)

This invention relates to mercaptans and it involves the preparation of monomeric and polymeric polysulfides.

It is an object of the invention to provide novel methods for making mercaptans and derivatives thereof.

The principles of the invention and the manner in which it is differentiated from the prior art will be clear from the following description including certain symbolic or schematic formulae and equations illustrating those principles, which will be defined in the claim.

Case 1.—Preparation of unifunctional mercaptans

The symbolic representation of the process is as follows:

(1) $RX + NaSSNa + XR = RSSR + 2NaX$ (2) $RSSR + NaSH = RSNa + RSH + S$ (3) $RSNa + H^+ = RSH + Na^+$

Case 2.—Preparation of bifunctional mercaptans (1) $XRX + NaSSNa \rightarrow$
    $\cdots SSRSSRSSR \cdots SSRSSRSSR \cdots +$
    $NaSH \cdots \rightarrow$ (2) $HSRSNa + S$ (3) $HSRSNa + H^+ = HSRSH + Na^+$

Case 3.—Preparation of trifunctional mercaptans

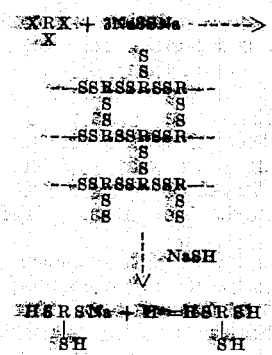

$HSRSNa + H^+ = HSRSH$
$\phantom{HSRSNa}SH\phantom{...}SH$

Referring to Case 1, R is in general any organic radical having attached to a carbon atom thereof a substituent X which is split off by reaction with a soluble or alkaline polysulfide whereby condensation of the radicals R through a polysulfide linkage or bridge occurs to produce the monomeric organic polysulfide RSSR. X may be a halogen or any substituent to split off, e. g., nitrate, acid sulfate, formate, acetate, propionate, etc. It combines with the cation of the soluble or alkaline polysulfide to form the salt NaX. Instead of the cation sodium, numerous other cations may be substituted, e. g., potassium, lithium, ammonium, substituted ammonium, caesium, etc. The soluble or alkaline polysulfide is preferably the disulfide but may be a tri-, tetra-, penta- or hexasulfide or mixtures thereof.

Referring to Equation 2 of Case 1, the monomeric polysulfide RSSR is reacted with sodium hydrosulfide. Instead of sodium hydrosulfide, any ionizable hydrosulfide may be used and generically the reagent used here may be any ionizable sulfide, e. g., hydrogen sulfide, sodium sulfide, potassium sulfide, lithium sulfide, caesium sulfide, ammonium sulfide, substituted ammonium sulfides, calcium sulfide, barium sulfide, manganous sulfide, etc.

It will be seen that the reaction is a splitting or cleavage of the organic polysulfide, with sulfur as a by-product and it has been found that the use of a sulfur acceptor is necessary to get a satisfactory reaction. Sulfites, e. g., sulfites of sodium, potassium, ammonium, substituted ammonium, lithium, calcium, barium, in fact, sulfites in general, are good example of a sulfur acceptor. In general any reagent that will remove sulfur from the sphere of the reaction as fast as it is formed and not seriously impair the potency of the sulfide splitting or cleavage reagent, will serve the purpose of a sulfur acceptor.

The ionizable sulfides and hydrosulfides are so closely related that they may be comprehended within the generic term "ionizable sulfides" for the purpose of this invention.

When the splitting action is completed, the mercaptan will be in the form of a mercaptide if an ionizable hydrosulfide or sulfide of the salt type has been used, from which mercaptide the mercaptan can be liberated by treatment with any reagent furnishing hydrogen ions at a concentration sufficient for the purpose, e. g., a mineral or other acid. If hydrogen sulfide is the splitting agent, the mercaptan will be formed as such.

The method of the invention is a general one not dependent on any specific structure of the radical R and that specific structure is therefore subject to wide variation. It may indeed be any organic radical. The formation of the organic polysulfide according to Equation 1 goes more easily when substituent X is attached to an aliphatic carbon atom. However by using high temperatures and pressures the reaction also goes when X is attached to carbon in an aryl nucleus.

By way of example, the following specific illustration of the general formula RX may be given.

$$CH_3X$$
$$CH_3(CH_2)_nX$$

where $n$ may vary from 1 to 30 or more $$CH_2=CHCH_2X$$
$$CH_3CH=CHCH_2X$$
$$CH_2=CMeCH_2X$$
$$Me_2C=CHCH_2X$$

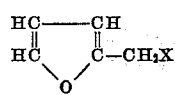

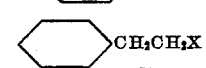

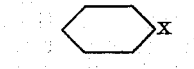

$$HOC_2H_4X$$
$$HOC_3H_6X$$
$$HO(CH_2)_nX$$

where $n$ may vary from 2 to 30 or more

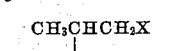

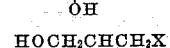

$$NH_2CH_2CH_2X$$
$$NH_2(CH_2)_nX$$

where $n$ may vary from 2 to 30 or more $$NC(CH_2)_nX$$

where $n$ may vary from 2 to 30 or more

Referring again to Equation 1 the alkaline polysulfide (used to make the organic polysulfide) is shown as the disulfide. Polysulfides of higher rank than the disulfide, e. g., the tri-, tetra-, penta- and hexasulfides may be used. There is no advantage in doing so because the excess sulfur above the disulfide "rank" is simply stripped off by the sulfide or hydrosulfide in Equation 2. Therefore, in Equation 1 disulfides are the preferred species of polysulfides.

Referring now to Case 2, the procedure is analogous, the chief difference being that instead of using a unifunctional organic reactant having the formula RX, a bifunctional reactant is used, i. e., an organic compound containing only two substituents X attached to each of two carbon atoms, respectively. As a result of this bifunctionality, an organic polymeric polysulfide, preferably disulfide is formed the splitting of which yields a monomeric dimercapto compound. The same sulfide splitting agent may be used. Here again, a sulfur acceptor is necessary. Here again, the reaction mechanism is a general one not dependent on the specific structure of the organic compound (within the definition given). Numerous example of bifunctional organic reactants may be seen by reference to Patrick Patents 1,890,191 and 2,014,166. All of the numerous bifunctional organic compounds shown in these patents may be used and converted into corresponding mercapto compounds.

The procedure in Case 3 is similar except that the organic compound used is trifunctional instead of bifunctional. Since it is the functionality and not the specific structure which is responsible for the generic reaction, in all of the cases mentioned, that specific structure will naturally vary widely in Case 3 as well as Cases 1 and 2 and a few specific examples of compounds $$XRX$$
$$X$$

will therefore suffice, as follows:

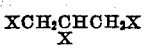

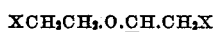

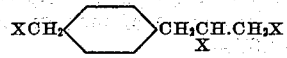

Reduced to its simplest terms it will be seen that the invention accomplishes the conversion of the X substituent into an SH group where X is a halogen or other substituent split off by reaction with an alkaline or soluble polysulfide.

By employing a mixture of organic reactants having the symbol $$RX, XRX \text{ and } XRX$$
$$X$$

where R has different specific structure in the several compounds, mixtures of specifically different mercaptans may be obtained.

It will be understood that mercaptans having a functionality greater than three (more than three SH groups) may be made, in the light of the foregoing, by choosing an organic reactant having a corresponding functionality.

To further illustrate but not to limit the methods of the invention the following detailed examples are given:

*Example I:—Illustrating Case 1*

2 mols of butyl chloride are caused to react with 500 ml. of a 2-molar solution of sodium disulfide, preferably in the presence of 5 g. of magnesium hydroxide dispersed in the aqueous polysulfide solution. The mixture of the organic halide and the polysulfide are heated together for about one hour with suitable agitation to about 60 to 70° C. to cause substitution of the halogen by the disulfide group with elimination of NaCl.

At the completion of the reaction, the dispersion of the organic sulfur compound is caused to settle out of the solution. The supernatant liquid is withdrawn and the dispersion is diluted with water to a volume of about 300–400 ml.

One mol of sodium hydrosulfide and one mol of sodium sulfite are dissolved in the aqueous dispersion and the mixture is heated with agitation to about 50 to 60° C. for an hour.

The dispersion is acidified to a pH of about 6 preferably with acetic acid and the mercaptan separated by any suitable means, preferably by steam distillation in this case.

Yields are from 85 to 95% of theoretical.

Example 2.—Further illustrating Case 1

2 mols of ethylene chlorhydrin are caused to react with 500 ml. of a 2-molar solution of $Na_2S_2$, no dispersant is necessary, by slow addition of the chlorhydrin to the stirred polysulfide keeping the temperature between 30 and 40° C. After the chlorhydrin is all in and all tendency for the temperature to rise has ceased, the temperature is raised to about 80° C. for 15 minutes, then the agitation is stopped and the heavy oil is allowed to settle out. The supernatant liquid is withdrawn and the volume restored with water.

One mol each of NaSH and $Na_2SO_3$ is added and the liquid heated to about 60 to 70° C. with agitation for about one hour. The mercapto ethanol so formed is separated preferably by steam distillation.

Example 3.—Illustrating Case 2

One mol of chlorethoxyethyl chloroethyl ether, $ClC_2H_4OC_2H_4OC_2H_4Cl$, is caused to react with 500 ml. of a 2-molar solution of sodium disulfide in the presence of magnesium hydroxide, by heating with agitation to from 70 to 80° C. for one hour. The dispersed latex-like polymer is settled out of the liquid and the latex is diluted to about 500 ml. with water.

One mol each of NaSH and $Na_2SO_3$ are added and the heating and agitation is continued for about an hour at 70 to 80° C.

The liquid is brought to a pH of about 6 with acid—preferably acetic—and the mercaptan $HSC_2H_4OC_2H_4OC_2H_4SH$, separated by distillation with steam or by extraction. Yields about 85%.

Example 4.—Illustrating Case 3

Proceed as in Example 3, except using 2 mols of the trifunctional reactant to 3 mols of $Na_2S_2$ and split with 3 mols each of NaSH and $Na_2SO_3$.

What is claimed is:

Process of making mercaptans which comprises reacting an organic polysulfide having a symbolic formula of the group consisting of RSSR and —SSR'SSR'SSR'— where R and R' are alkyl and alkylene radicals, respectively, with a sulfide reagent of the group consisting of alkaline sulfides and hydrosulfides in the presence of an alkaline sulfite, the sulfide reagent and alkaline sulfite being used in the ratio of at least one mol of each to each mol of the monomeric polysulfide RSSR and the polymeric unit —R'SS— respectively.

JOSEPH C. PATRICK.

REFERENCES CITED

The following references are of record in the file of this patent:

UNITED STATES PATENTS

| Number | Name | Date |
|---|---|---|
| 1,682,920 | Maximoff | Sept. 4, 1928 |
| 2,031,529 | Elbel | Feb. 18, 1936 |
| 2,050,370 | Orthner | Aug. 11, 1936 |
| 2,051,806 | Allen | Aug. 25, 1936 |
| 2,252,366 | Frost | Aug. 12, 1941 |
| 2,278,128 | Patrick | Mar. 31, 1942 |
| 2,347,840 | Nygaard | May 2, 1944 |
| 2,389,755 | Baker | Nov. 27, 1945 |

FOREIGN PATENTS

| Number | Country | Date |
|---|---|---|
| 228,868 | Germany | Nov. 24, 1910 |
| 453,701 | Great Britain | Sept. 10, 1936 |
| 458,781 | Great Britain | Dec. 28, 1936 |

OTHER REFERENCES

"Transactions of the Faraday Society," Patrick, vol. 32, Jan. 1936, pages 347–357.

"Industrial and Eng. Chem.," Martin, vol. 38, pages 1145–1149 (1936).